United States Patent [19]

Scheer

[11] Patent Number: 4,671,398
[45] Date of Patent: Jun. 9, 1987

[54] CLUTCH UNIT OF THE DIAPHRAGM SPRING TYPE

[75] Inventor: Erich Scheer, Prosselsheim, Fed. Rep. of Germany

[73] Assignee: Fichtel & Sachs AG, Schweinfurt, Fed. Rep. of Germany

[21] Appl. No.: 849,476

[22] Filed: Apr. 8, 1986

[30] Foreign Application Priority Data

Apr. 13, 1985 [DE] Fed. Rep. of Germany ....... 3513315

[51] Int. Cl.$^4$ ............................................ F16D 13/50
[52] U.S. Cl. ................................ 192/70.27; 192/89 B
[58] Field of Search ............................ 192/89 B, 70.27

[56] References Cited

U.S. PATENT DOCUMENTS

| 3,939,951 | 2/1976 | Sink et al. | 192/89 B |
| 4,184,578 | 1/1980 | Moore et al. | 192/89 B |
| 4,210,233 | 7/1980 | Courbot | 192/89 B |
| 4,399,897 | 8/1983 | Billet et al. | 192/89 B |
| 4,542,813 | 9/1985 | Schierling | 192/89 B X |
| 4,555,005 | 11/1985 | Dixon | 192/89 B X |

FOREIGN PATENT DOCUMENTS 2306255 8/1973 Fed. Rep. of Germany .... 192/89 B
1215190 10/1968 United Kingdom .

Primary Examiner—Carl D. Friedman
Attorney, Agent, or Firm—Toren, McGeady & Associates

[57] ABSTRACT

In a clutch unit of the diaphragm spring type a support ring is positioned between a clutch cover and a diaphragm spring. The diaphragm spring is fastened to the clutch cover by noses of the diaphragm spring which encompass the support ring on the one hand and by projections of the clutch cover which also encompass the support ring on the other hand. The noses are accommodated by apertures of the clutch cover and the projections are accommodated by openings of the diaphragm spring. The support ring is an open support ring so that it can be inserted in radially outward direction between the diaphragm spring and the projections on the one hand and the clutch cover and the noses on the other hand.

3 Claims, 4 Drawing Figures

CLUTCH UNIT OF THE DIAPHRAGM SPRING TYPE

BACKGROUND OF THE INVENTION

In a clutch unit of the diaphragm spring type the diaphragm spring is supported on the clutch housing through support ring means. The diaphragm spring is mounted on the clutch cover across a support ring.

STATEMENT OF THE PRIOR ART

A diaphragm spring clutch of the above-stated style of construction is known for example from GB-PS No. 1,215,190. In this known diaphragm spring clutch distance bolts which are riveted in the clutch cover extend through the openings in the diaphragm spring. To each of the two sides of the diaphragm spring there is arranged a support ring and the support ring directed towards the pressure plate is held by corresponding heads of the distance bolts.

Diaphragm spring clutches of this style of construction are relatively expensive as a result of the many individual parts which are required.

OBJECT OF THE INVENTION

It is therefore the problem of the present invention to produce a diaphragm spring clutch which, with full functional validity, is as simple as possible in assembly.

SUMMARY OF THE INVENTION

A clutch unit of the diaphragm spring type comprises a clutch cover of sheet metal having an axis and a circumferentially extending wall portion substantially perpendicular to said axis. A pressure plate is substantially coaxial with said clutch cover and fastened thereto such as to be substantially immobile with respect to said clutch cover in circumferential direction and to be axially shiftable with respect to said clutch cover. A diaphragm spring is substantially coaxial with said clutch cover and has a main plane substantially perpendicular to said axis. Said diaphragm is located axially between said pressure plate and said clutch cover. Said diaphragm spring has a radially outer zone engaging said pressure plate, a radially intermediate zone supported by said wall portion and a radially inner zone provided with radially extending slots defining tongues therebetween. Said slots extend radially outward into said radially intermediate zone and are circumferentially broadened in said radially intermediate zone such as to define a plurality of openings in said radially intermediate zone. Support ring means are provided in said radially intermediate zone. Said support ring means include a circular support ring having its center substantially on said axis. Said circular support ring and said diaphragm spring are mounted to said clutch cover by mounting means located in the area of said openings. Said openings include first type openings and second type openings alternating in circumferential direction about said axis. Said first type openings are in axial alignment with radially inwardly pointing noses integral with said diaphragm. Said axially pointing noses are axially offset with respect to said main plane towards said clutch cover and are accommodated by respective apertures of said clutch cover. Said clutch cover is provided with inwardly pointing projections integral therewith. Said projections are axially offset with respect to said wall portion towards said pressure plate and are accommodated within said second type openings of said diaphragm. Said circular support ring is interrupted in at least one location along its circumference and is accommodated axially between said diaphragm spring and said projections on the one side and said wall portion and said noses on the other side. By the arrangement of an open support ring between the noses and the projections the possibility is obtained of using one single support ring and simply omitting the distance bolts. Nevertheless full function of the diaphragm spring is guaranteed. By the elimination of the distance bolts and a second support ring a considerable space advantage in the axial direction is also obtained. Furthermore, the assembly of the diaphragm spring clutch becomes very simple.

According to a first embodiment at least the ones of said noses and said projections converge in radially outward direction towards said diaphragm spring and said wall portion, respectively, and said support ring is elastically biased in radially outward direction. In this way the support ring can center itself without play. This freedom from play is maintained even if wear occurs at the points where forces act, since the ring is arranged for automatic radial readjustment.

According to another embodiment said support ring is of corrugated formation with corrugation crests and corrugation troughs axially offset with respect to a middle plane of said support ring. The corrugation crests are arranged in the region of said noses of the diaphragm spring and the corrugation troughs are in the region of the projections of the clutch cover. Due to this axially corrugated wire ring, which is axially biased, freedom of the mounting from play can be guaranteed even without an inherent stress in the radial direction.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWING

The invention will be explained in greater detail by reference to two examples of embodiment. Individually.

DESCRIPTION OF THE PREFERRED EMBODIMENT

Figure 1:
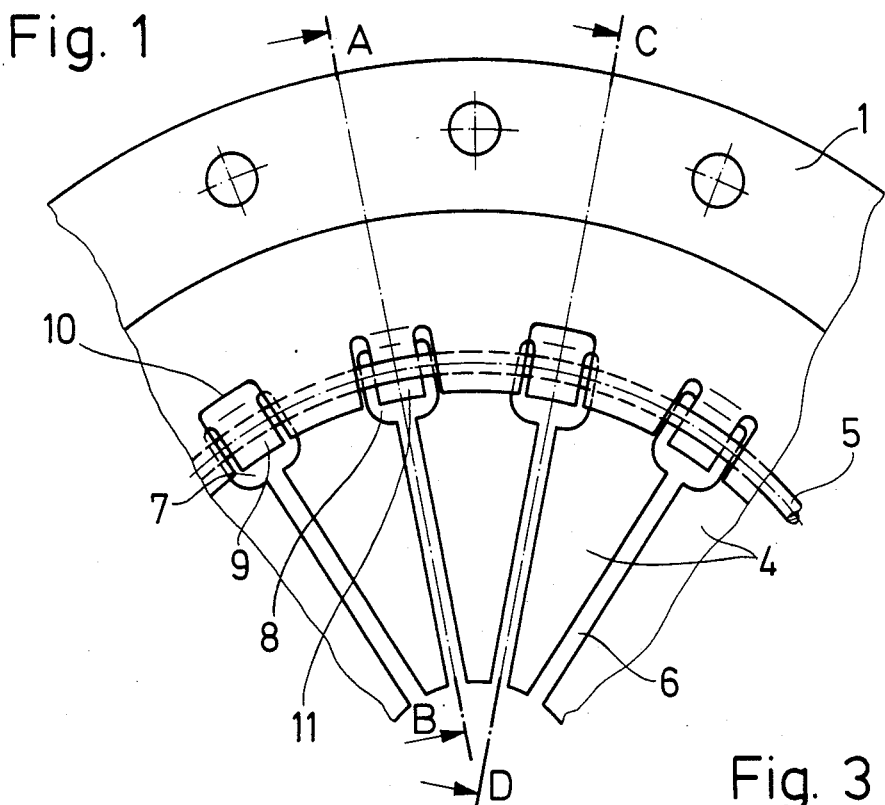
FIG. 1 shows the partial elevation of a diaphragm spring clutch.
Figure 2:
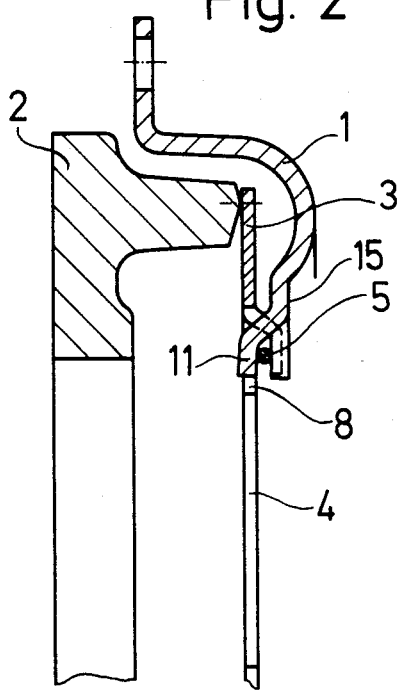
FIG. 2 shows the partial section A–B according to FIG. 1.
Figure 3:
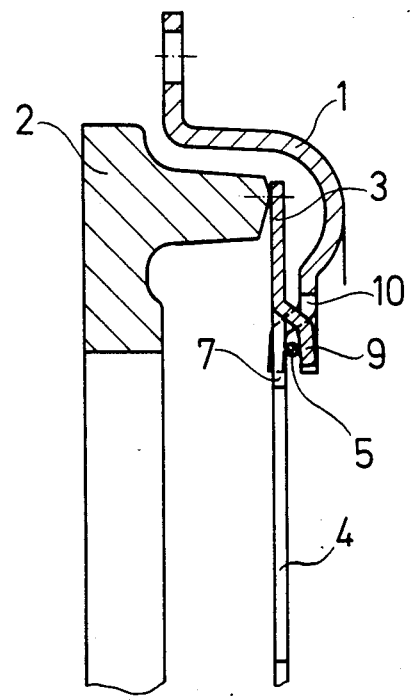
FIG. 3 shows the partial section C–D according to FIG. 1.

As may be seen from FIGS. 1 to 3, a diaphragm spring 3 is arranged in the usual way between a circumferential wall 15 of a clutch cover 1 and a pressure plate 2. It engages in a radially outer zone the pressure plate 2 and is supported in a radially intermediate zone through a support ring 5 on the clutch cover 1. The pressure plate 2 is arranged fast in rotation, but axially displaceably in relation to the clutch cover 1 in a manner not further illustrated. Usually tangential leaf springs can be provided for this purpose. The diaphragm spring 3 comprises an even number of first type openings 7 and an even number of second type openings 8 in the region of its tilting circle. These different openings 7 and 8 alternate. In a radially inner zone these openings 7 and 8 narrow again and merge into slots 6 which separate the individual spring tongues 4 from one another. The first type openings 7 in the diaphragm spring 3 are of such configuration that they contain a radially inwardly pointing nose 9 which is punched out of the material of the diaphragm spring 3. Each of these noses 9 is axially offset away from the pressure plate 2, approximately by the amount of the material cross-section of the support ring 5. In the region of each of the noses 9 a corresponding aperture 10 is provided in the clutch cover 1. Each of the first type openings 7 in the diaphragm spring 3 is followed, seen in the circumferential direction, by a second type opening 8. Into this second type opening 8 there extends a projection 11 which is punched clear out of the material of the clutch cover 1 and is axially offset in the direction towards the pressure plate 2 by approximately the dimension of the material cross-section of the support ring 5. At least the ones of the noses 9 and the projections 11 converge in radially outward direction with respect to the diaphragm spring 3 and the wall portion 15, respectively, so that radially outwardly narrowing gaps result into which the support ring 5 is inserted in the assembly of the diaphragm spring clutch. Thus, due to the configuration of this open support ring 5 with resilience preferably in the radial direction a positively predetermined position of the support ring 5 in this narrowing gap thus results. Preferably both noses 9 and projections 11 slightly converge so that play occurs during clutch actuation at no point of this connection between diaphragm spring 3 and clutch cover 1. Due to the radially resilient arrangement of the support ring 5 furthermore the great advantage is obtained that in the case of wear at the abutment points in each case between the support ring 5 for one part and diaphragm spring 3 or clutch cover 1 for the other part, an automatic readjustment is provided.

Figure 4:
FIG. 4 is a partial side view of another embodiment of the support ring illustrated in FIGS. 1–3.

It is, however, also possible to make the support ring 5 axially corrugated, note FIG. 4 whereby its radial resilience can be eliminated. The support ring 5 is then inserted under axial prestress into the gap between the noses 9 and the projections 11. Thus again wear compensation is guaranteed. In such a case it is advantageous, in the elevation of the diaphragm spring clutch according to FIG. 1, to place the corrugation crests of the support ring 5 into the region of the noses 9 of the diaphragm spring 3 and the corrugation troughs into the region of the projections 11 of the clutch cover 1.

While specific embodiments of the invention have been shown and described in detail to illustrate the application of the inventive principles, it will be understood that the invention may be embodied otherwise without departing from such principles.

The reference numerals in the claims are only used for facilitating the understanding and are by no means restrictive.

What is claimed is:

1. A clutch unit of the diaphragm spring type, comprising a clutch cover (1) of sheet metal having an axis and a circumferentially extending wall portion (15) substantially perpendicular to said axis, a pressure plate (2) substantially coaxial with said clutch cover (1) and fastened thereto such as to be substantially immobile with respect to said clutch cover (1) in circumferential direction and to be axially shiftable with respect to said clutch cover (1), a diaphragm spring (3) substantially coaxial with said clutch cover (1) and having a main plane substantially perpendicular to said axis, said diaphragm spring (3) being located axially between said pressure plate (2) and said clutch cover (1), said diaphragm spring (3) having a radially outer zone engaging said pressure plate (2), a radially intermediate zone supported by said wall portion (15) and a radially inner zone provided with radially extending slots (6) defining tongues (4) therebetween, said slots (6) extending radially outward into said radially intermediate zone and being circumferentially broadened in said radially intermediate zone such as to define a plurality of openings (7,8) in said radially intermediate zone, support ring means (5) being provided in said radially intermediate zone, said support ring means (5) including a circular support ring (5) having its center substantially on said axis, said circular support ring (5) and said diaphragm spring (3) being mounted to said clutch cover (1) by mounting means located in the area of said openings (7,8), said openings (7,8) including first type openings (7) and second type openings (8) alternating in circumferential direction about said axis, said first type openings (7) being in axial alignment with radially inwardly pointing noses (9) integral, with said diaphragm spring (3), said radially inwardly pointing noses (9) being axially offset with respect to said main plane towards said clutch cover (1) and being accommodated by respective apertures (10) of said clutch cover (1), said clutch cover (1) being provided with radially inwardly pointing projections (11) integral therewith, said projections (11) being axially offset with respect to said wall portion (15) towards said pressure plate (2) and being accommodated within said second type openings (8) of said diaphragm spring (3), said circular support ring (5) being interrupted in at least one location along its circumference and being accommodated axially between said diaphragm spring (3) and said projections (11) on the one side and said wall portion (15) and said noses (9) on the other side.

2. A clutch unit as set forth in claim 1, at least the ones of said noses (9) and said projections (11) converging radially outwardly towards said diaphragm spring (3) and said wall portion (15), respectively, said support ring (5) being elastically biased in radially outward direction.

3. A clutch unit as set forth in claim 1, said support ring (5) being of corrugated formation with corrugation crests and corrugation troughs axially offset with respect to a middle plane of said support ring (5), the corrugation crests being arranged in the region of said noses (9) of the diaphragm spring (3) and the corrugation troughs being in the region of the projections (11) of the clutch cover (1).

* * * * *